March 3, 1970 C. K. HULEN 3,498,202

METHOD OF MAKING REGISTERING LAYOUT ASSEMBLIES FOR PRINTING PLATES AND A NEGATIVE CARRIER THEREFOR

Filed Sept. 11, 1967 2 Sheets-Sheet 1

INVENTOR.
CLAUDE K. HULEN
BY
Fishburn, Gold and Litman
ATTORNEYS

METHOD OF MAKING REGISTERING LAYOUT ASSEMBLIES FOR PRINTING PLATES AND A NEGATIVE CARRIER THEREFOR

Filed Sept. 11, 1967 2 Sheets-Sheet 2

INVENTOR.
CLAUDE K. HULEN
BY
Fishburn, Gold and Litman
ATTORNEYS

United States Patent Office 3,498,202

Patented Mar. 3, 1970

3,498,202

METHOD OF MAKING REGISTERING LAYOUT ASSEMBLIES FOR PRINTING PLATES AND A NEGATIVE CARRIER THEREFOR

Claude K. Hulen, Kansas City, Mo., assignor to American Photocopy Equipment Company, Evanston, Ill., a corporation of Illinois Filed Sept. 11, 1967, Ser. No. 666,762

Int. Cl. G03b *27/14*

U.S. Cl. 95—85 14 Claims

ABSTRACT OF THE DISCLOSURE

A method of preparing copy layout flat assemblies in the making of printing plates for black and white or color separation printing including punching aligned index holes in a plurality of image bearing sheets in a predetermined relation to said image, trimming the edges of the image bearing sheets in a predetermined relation to the index holes, providing a master layout with pin indexing for page positioning and an indexing pin register bar at a gripper edge, arranging punched strips of masking sheets on the master layout and positioning the punched and trimmed sheets in selected index location, and adhering a negative carrier in the form of a transparent sheet with index holes therein on one surface of the arranged sheets and strips in covering relation to and using the completed layout and carrier for making necessary exposures and process steps in preparation of printing plates. A negative carrier of thin transparent film with pressure sensitive adhesive on one face and index holes adjacent one edge for registering with index pins in the indexing pin register bar at the gripper edge and adhering arranged pages of copy forming a copy layout assembly for preparation of printing plates.

Heretofore most stripping work has involved time consuming use of hand tools such as razor blades, scissors, and rulers. It was also necessary to hand tape each image bearing sheet in position for trimming the edges and in arranging the separate sheets in position to photograph or for further processing. It was necessary to precisely measure the location of each sheet when preparing a signature or other arrangement of pages of copy. Once the copy sheets in the signature assembly or other arrangement were removed if it became desirable to again set up the copy it was necessary to repeat the time consuming measuring, adjusting, and taping to obtain precise registry. Making printing plates for color separation copy was time consuming and required precise measuring and precise positioning of the respective sheets of copy. A certain amount of visual registration was necessary which was also time consuming to prepare and obtain the precise registry necessary for high quality printing.

The principal objects of the present invention are to provide a method of preparing copy layout flat assemblies in the making of printing plates wherein production is increased and simplified and the aforementioned difficulties are eliminated; to provide a method of preparing copy layout flat assemblies which is adapted to color processing and to black and white processing; to provide a method of trimming and arranging a plurality of image bearing copy sheets into form for a multiple page single printing sheet, securing said copy in a layout flat assembly, and registering the copy layout flat assembly to the printing plate; to provide a layout preparation method using punched index holes in the image bearing sheets of copy and pins on a layout surface for engaging in the index holes in each positioning step to maintain registry; to provide a layout preparation method wherein all pages of copy are adhered to a transparent film carrier; to provide a method of making copy layout flat assemblies using a film carrier which assemblies are reusable and which may be stored while maintaining precise registry of the copy; to provide a transparent film carrier for arranged sheets of copy having a pressure sensitive adhesive on one surface; and to provide a method of preparing copy layout flat assemblies in the making of printing plates which is fast, simple, economical and which results in accurate work.

Other objects and advantages of this invention will become apparent from the following description taken in connection with the accompanying drawings wherein are set forth by way of illustration and example certain embodiments of this invention.

Figure 1:
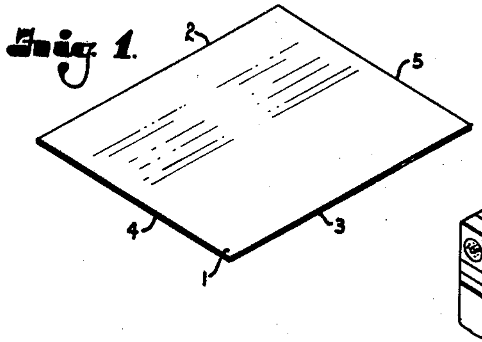
FIG. 1 is a perspective view of a camera ready sheet of copy having two pages of copy thereon.
Figure 2:
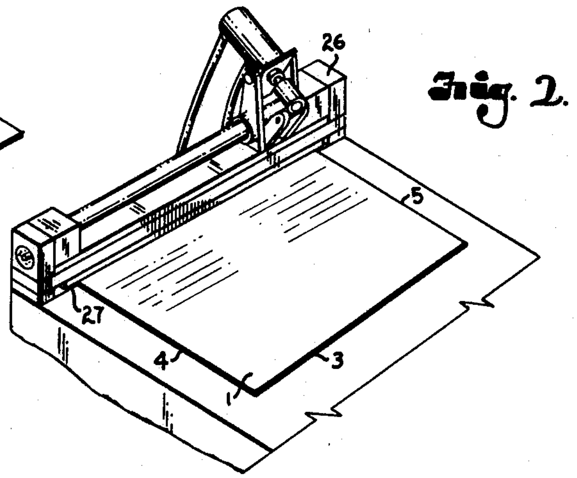
FIG. 2 is a perspective view of the sheet in a punching and one edge trimming station.

Referring more in detail to the drawings:

The reference numeral 1 generally designates an image bearing sheet which in the illustrated structure has two pages of copy thereon. The sheet 1 has a top margin 2, a bottom margin 3 and opposed side margins 4 and 5.

A predetermined number of sheets 1 are punched to provide index holes 6 adjacent their respective top margins 2. The margins of the sheets are trimmed, and the respective sheets 1 are cut into separate pages of copy 7 and 8. The separate pages of copy are then arranged in a predetermined relationship of pages on a master page layout 9. A negative carrier or copy layout carrier 10 is adhered to the arranged pages of copy to form a copy layout flat assembly 11 for holding the arranged copy in precise registry.

The negative carrier or copy layout carrier 10 consists of a suitable transparent sheet or film 12 having a suitable pressure sensitive non-drying adhesive 13 on one face thereof and before use a protective sheet 14 is removably attached to the adhesive 13. The carrier has a plurality of aligned index holes 15 adjacent one edge 16 thereof. It is preferred that the transparent film or sheet 12 be an acetate sheet in the nature of 0.0015 inch thick and with a frosty surface on one side or face and with the protective sheet be a peel-away covering of wax or silicone coated paper 14 attached to the adhesive 13 in a covering relation thereto.

Figures 7, 8, 9, 10:
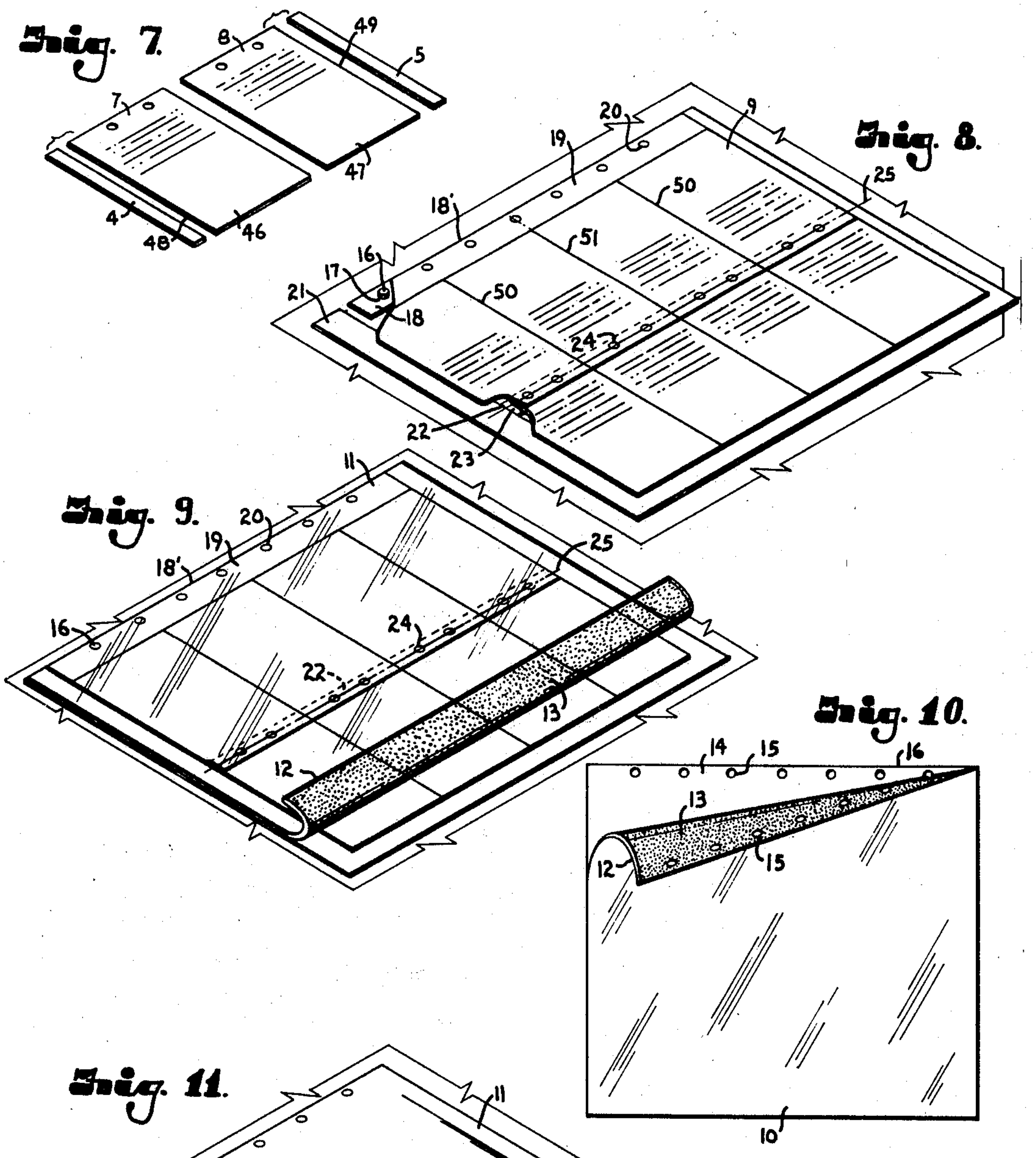
FIG. 7 is a perspective view of the sheet cut into two separate pages of copy and trim scrap cut from opposed side edges.
FIG. 8 is a perspective view of the master layout with eight pages of copy thereon to be printed on a single sheet.
FIG. 9 is a perspective view of the copy layout assembly with the negative carrier being secured thereto.
FIG. 10 is an elevation of the negative carrier showing the removable protective sheet.
Figure 11:
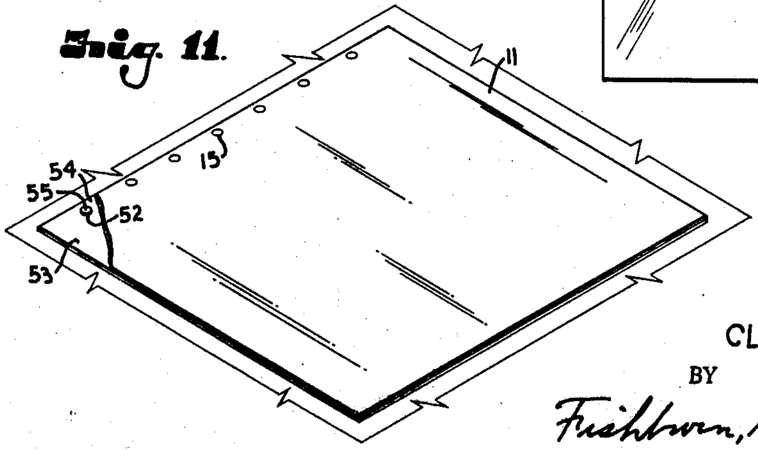
FIG. 11 is a perspective view of a sensitized printing plate with a copy layout flat assembly in pin registry thereon for exposure of said printing plate and with a portion of the copy layout flat assembly broken away to show the printing plate.

The master page layout 9 has a plurality of spaced register pins 17 in an elongate index bar 18 which forms a gripper edge indexing means for a gripper edge 18′ of the master page layout 9. A first or gripper edge masking sheet 19 is provided with index holes 20 punched therein by a suitable instant register punch, said index holes 20 corresponding in size, alignment, and position to the pins 16 of the index bar 18. In the illustrated master page layout 9 the masking sheet 19 is placed on the index bar with the pins 16 extending through the holes 20 and three exterior edge masking sheets 21 are arranged on the master page layout 9 in a predetermined relationship with the index bar 18 to form a suitable masking frame with one exterior edge masking sheet 21 parallel with and spaced from the index bar 18 and with the two remaining exterior edge masking sheets 21 being positioned adjacent their respective ends, thereby closing the masking frame as shown in FIG. 8.

A sheet indexing means 22 is placed in a predetermined relationship with the index bar 18. In the illustrated structure the sheet indexing means 22 each consist of an elongated index bar 23 having index pins 24 of equal size spaced therealong, said index bar 23 being secured on a first or horizontal center line 25 of the master page layout 9 as by double faced pressure sensitive tape. The index bars are to accurately position the separate pages 7 and 8 of copy and said pages are placed in position and the pins 24 extend through the holes 6 to fix the pages in the selected location. In the illustrated structure the pages 7 and 8 are in head-to-head pairs in a predetermined arrangement of side-by-side pairs to form a copy layout with the separate pages of copy in multiples to form a signature layout as shown in FIG. 8 or other desired arrangement of pages of copy. In the illustrated copy layout the index holes 6 of a single trimmed page of copy receive the respective pins 24 and a second trimmed page of copy of each head-to-head pair of overlaps the first single page of copy with the index holes 6 of said second page also receiving the respective pins 24. The separate pages of copy may butt-joint, gap, or overlap depending on the operator's choice.

Pin registering separate pages of copy is a very fast procedure and results in extremely accurate copy layout and precise registry when the index holes 6 have a predetermined relation with the image thereon and edges are trimmed in a predetermined relation with the index holes 6.

The copy layout carrier 10 is adhered to the arranged pages of copy to form the copy layout flat assembly 11 and maintain precise registry of the arranged pages of copy. A portion of the protective sheet 14 is peeled away from the transparent sheet 12 and the sheet is then moved over the layout to register the holes 15 in the transparent sheet 12 with the pins 17. The sheet 12 is then lowered so the pins 17 extend through the holes 15 and the exposed pressure sensitive adhesive is wiped or pressed into contact with the gripper edge masking sheet 19, a portion of the masking frame formed by the exterior edge masking sheets 21, and a portion of the arranged pages of copy. The protective sheet 14 is then completely peeled away from the transparent sheet 12 and the remaining portion of the transparent sheet 12 is then wiped or pressed into wrinkle free contact with the arranged image bearing pages of copy and the remaining portion of the exterior edge masking sheets 21 of the masking frame, thereby forming the copy layout flat assembly 11 as shown in FIG. 9.

The copy layout flat assembly 11 maintains the arranged pages of copy in precise registry and is reusable and may be stored while maintaining the precise registry of the arranged pages of copy. The copy layout assembly 11 may be stored flat or may accordion fold then fold at a right angle and file in any suitable open end envelope.

The method of making copy layout flat assemblies 11 is adapted for making black and white printing plates and for making color separation plates. Either all negative or all positive image bearing pages of copy may be employed in each copy layout assembly 11. In exposing plates, the plates are also punched with register index holes and when negatives are employed in the copy layout flat assembly 11 it is pin registered directly to the printing plate and when positives are employed a contact negative is prepared and punched adjacent a gripper edge registered with the layout and when developed it will pin register directly to the printing plate for preparation thereof.

The index holes 6 may be hand punched and the margins may be hand trimmed however, it is preferred to machine punch and trim, thereby eliminating the time consuming hand work with razor blades, scissors, tape, rulers, etc.

Figure 3:
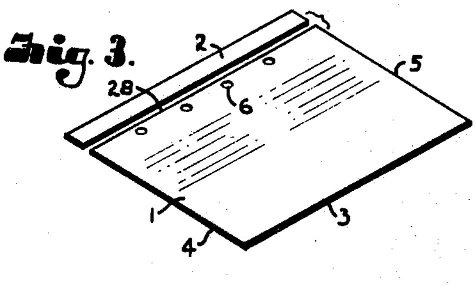
FIG. 3 is a perspective view of the sheet with punched index holes adjacent the trimmed edge and trim scrap cut therefrom.
Figure 4:
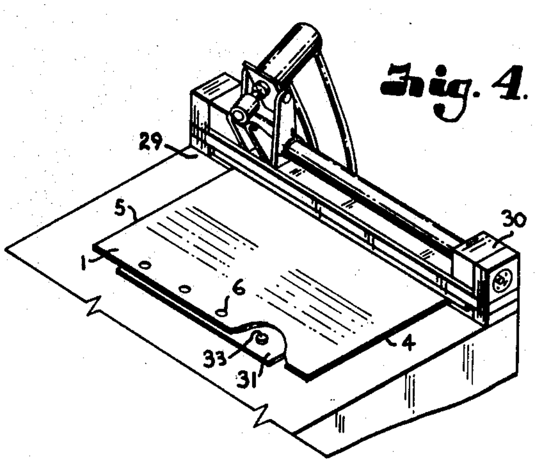
FIG. 4 is a perspective view of the sheet in a trimming station for trimming the opposite edge.

A first sheet 1 is placed on a punch and cutter machine 26 having a punching and one edge trimming station 27. The sheet 1 is then positioned on the station 27 and suitably held in position as by a vacuum or pressure plates. An operator (not shown) activates a suitable punch and knife or shear to simultaneously punch the index holes 6 and trim the top margin 2 while holding the first image bearing sheet 1 in a predetermined position. The index holes 6 have a predetermined relation with the images on the separate pages of copy 7 and 8 and a trimmed top edge 28 has a predetermined relation and spacing with the index holes 6. FIG. 3 illustrates the result of the operation of the punching station 27.

Figure 5:
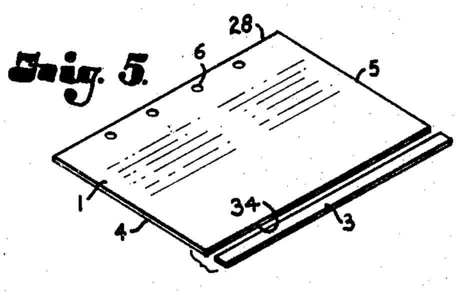
FIG. 5 is a perspective view of the sheet with the opposite edge trimmed and the trim scrap therefrom.
Figure 6:
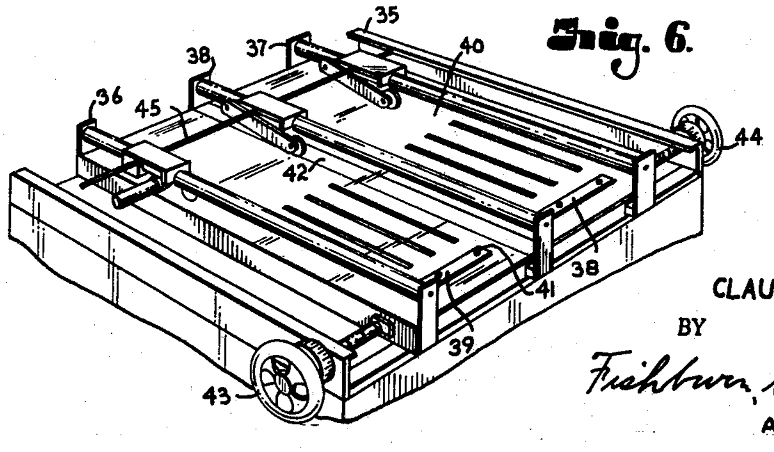
FIG. 6 is a perspective view of the cutting machine with the sheet in position for trimming side edges and cutting into page size.

The first image bearing sheet 1 is then placed on a trimming station 29 of a cutting machine 30 which may be arranged on the machine 26 opposite the station 27. In order to accurately position the sheet 1 relative to the knife or cutter of the station 29 an index pin bar 31 is secured to the surface 32. The pins 33 of the bar 31 are complimentary in size, alignment, and spacing to the index holes 6 thereby accurately positioning the sheet 1 when the holes 6 are engaged over the pins 33. The index bar 31 is located at a predetermined position and suitably secured in place as by double-faced tape, so that a sheet engaged therewith is positioned for cutting to the desired length thereby eliminating the time consuming precise measuring for location of each subsequent image bearing sheet 1. The operator activates a suitable knife or shear to trim the bottom margin 3 of the sheet 1. The first image bearing sheet 1 is suitably held in position as by vacuum or pressure plates during the trimming of the bottom margin 3 thereby forming a trimmed second or bottom edge 34 at a predetermined relation with the trimmed top edge 28 and the index holes 6. FIG. 5 illustrates the result of the operation of the trimming station 29.

The first image bearing sheet 1 having the trimmed top edge 28 and the trimmed bottom edge 34 is then placed on a cutting machine 35 which has a pair of adjustable cutting devices 36 and 37 and a stationary cutting device 38 intermediate the adjustable cutting devices 36 and 37. Separate index bars 38 and 39 are mounted on the surface 40 of the machine 35 between the center or stationary cutting device and each of the adjustable cutting devices 36 and 37 which are spaced laterally therefrom. The pins 41 of the index bars 38 and 39 are complementary in size, alignment, and spacing to the index holes 6 so sheets engaged thereby are accurately positioned and the machine 35 preferably has vacuum for holding the sheet in such position on the surface 40.

The index bars 38 and 39 are located at predetermined positions relative to a gutter or blank space 42 between the two pages of copy 7 and 8 on the image bearing sheet 1 and the stationary cutting device 38 so the stationary cutting device 38 will cut along the gutter between the two pages of copy 7 and 8. The adjustable cutting devices 36 and 37 are individually adjusted by suitable micrometer screw drives 43 and 44 to predetermined spacing from the cutting device 38 for cutting the respective side margins 4 and 5. In the illustrated structure the operator will pull-push a draw bar 45 which moves the cutters of adjustable cutting devices 36 and 37 and the stationary cutting device 38 through the image bearing sheet 1. The cutting machine 35 forms two separate pages of copy 46 and 47 with each page of copy having trimmed side edges 48 and 49, a trimmed top edge 28, and a trimmed bottom edge 34. FIG. 7 illustrates the result of operation of the cutting machine 35.

The punching and trimming performed by the machines 26 and 30 together with the trimming of the cutting machine 35 forms two separate pages of copy 46 and 47 with each having index holes 6 for pin registry location and with each of the pages of copy 46 and 47 having the precise size and shape for the master layout fold dimension. Fold lines 50 are illustrated as perpendicular to the first or horizontal center line 25 and parallel to a second or vertical center line 51. The illustrated trimmed pages of copy 46 and 47 each have the trimmed top edge 28 parallel with and adjacent the index holes 6 and with the trimmed bottom edge 34 parallel therewith and opposed. The trimmed side edges 48 and 49 are mutually parallel and each edge is perpendicular to the trimmed top edge 28 and to the trimmed bottom edge 34. The separate pages of copy 46 and 47 are then arranged in a predetermined relationship of pages on the master page layout 9. The copy layout carrier 10 is adhered to the arranged pages of copy to form the copy layout flat assembly 11 for holding the arranged copy in precise registry as previously described.

A suitable register punch is used to punch index hole 52 in a printing plate 53 having the suitable light sensitive surface 54 said index holes corresponding in size and spacing to that of the pins on the index bars. The copy layout flat asembly 11 is placed on the printing plate 53 and in contact with the light sensitive surface 54 and registered in position by pins 55 engaged in the index holes 20 of the gripper edge masking sheet 19, the index holes 15 of the copy layout carrier 10 and the index holes 52 of the printing plate 53. The printing plate 53 and the copy layout flat asembly 11 are exposed to a suitable light source (not shown) with the light passing through the copy layout flat asembly 11 thereby exposing the light sensitive surface 54.

Pin registering the respective image bearing sheet 1 on the trimming station 30, the cutting machine 35, and on the sheet indexing means 22 of the master page layout 9 is extremely fast and accurate. The punched index holes 6 are employed for trimming and arranging therefore all layout work is referenced to the image on the respective pages of copy.

The negative carrier or copy layout carrier 10 when adhered to the precisely arranged separate pages of copy in the master layout 9 maintains the precise arrangement of the separate pages of copy. The pin registering of the copy layout flat assembly 11 formed with the copy layout carrier 10 insures precise registry with the printing plates 53 for exposure. All copy layout flat assemblies 11 prepared on the same master page layout 9 will have the separate pages of copy in the same relation of joints and fold lines. The copy layout flat assemblies 11 will also all be the same size relative to the respective printing plates 53.

It is to be understood that while I have illustrated and described one form of my invention, it is not to be limited to the specific steps or sequence of steps herein described and shown except insofar as such limitations are included in the claims.

What I claim and desire to secure by Letters Patent is:

1. A method of preparing a copy layout assembly in the making of printing plates including:

(a) providing a master page layout having a plurality of spaced register pins in spaced parallel lines with one line adjacent one edge, (b) arranging a plurality of copy sheets with index holes in registry with register pins in a line on said master page layout, (c) placing a transparent film with a pressure sensitive adhesive on an under face in overlying relation to the copy sheets and with index holes in registry with the register pins on the master page layout, and (d) pressing said film onto the copy sheets in covering relation thereto to effect adherence of the adhesive to said copy sheet thereby forming an assembly for use in reproduction of the copy on printing plates.

2. A method of preparing a copy layout assembly in making of printing plates including:

(a) providing image bearing sheets, (b) punching a plurality of aligned index holes in said sheets adjacent one edge of the respective sheets, said index holes having a predetermined relation with said image, (c) trimming the edges of the image bearing sheets, in a predetermined relation to said aligned punched index holes, (d) providing a master copy layout corresponding to the printing plate size, (e) providing indexing means associated with said master copy layout, said indexing means having a size and spacing corresponding to the size and spacing of said index holes, (f) arranging the trimmed sheets on the master copy layout, (g) providing a copy layout carrier in the form of a transparent film with adhesive covering one face, and (h) adhering said copy layout carrier one face in face to face relation to said arranged sheets, thereby forming a copy layout flat assembly.

3. A printing plate copy layout carrier comprising, a transparent sheet of film having a pressure sensitive adhesive covering one face, and having a plurality of aligned uniformly spaced index holes of equal size adjacent one edge thereof for receiving printing copy register pins, said one face being adapted for adherence to a face of each of a plurality of items of copy to be reproduced in a printing flat to retain said items of copy in a fixed relation, said transparent sheet being acetate, a peel-away sheet releasably covering the pressure sensitive adhesive to protect same.

4. A method of preparing a copy layout assembly in the making of printing plates including:

(a) providing a master page layout having a plurality of spaced register pins in a line adjacent one edge, (b) providing a first masking sheet having index holes corresponding to said spaced register pins, said one edge being a gripper edge, (c) providing a plurality of exterior edge masking sheets, (d) engaging the index holes in said first masking sheet with said spaced register pins, (e) arranging a plurality of copy sheets on said master page layout, (f) arranging the exterior edge masking sheets in a predetermined relation with the first masking sheet thereby forming a masking frame, said frame having a predetermined relation to said plurality of copy sheets, (g) placing a transparent film with index holes in registry with the register pins on the master page layout, and (h) adhering said film to the copy sheets in covering relation thereto, thereby forming an assembly for use in reproduction of the copy on printing plates.

5. The method of preparing a copy layout assembly as set forth in claim 4 wherein said arranging the exterior edge masking sheets in a predetermined relation with the first masking sheet includes:

(a) placing said spaced register pins in a predetermined relation with a first center line of said master page layout, and (b) placing a sheet indexing means with spaced pins of equal size in a predetermined relation with the the first center line.

6. A method of preparing a copy layout assembly in the making of printing plates as set forth in claim 5 wherein said arranging a plurality of copy sheets on said master page layout includes:

(a) punching index holes in said copy sheets, said index holes corresponding to said sheet indexing means, (b) engaging said index holes with said sheet indexing means, and (c) arranging the copy sheets in a predetermined relationship of pages of copy.

7. The method of preparing a copy layout assembly as set forth in claim 6 wherein said arranging the copy sheets in a predetermined relationship includes:

(a) arranging the copy sheets in head-to-head pairs, (b) placing the pairs in overlapping head-to-head joints with said index holes engaging said sheet indexing means, and (c) placing said pairs side by side in a predetermined number of pairs.

8. The method of preparing a copy layout assembly as set forth in claim 7 wherein said placing said pairs side by side in a predetermined number of pairs includes:

(a) placing said pairs in a predetermined multiple of 4 pages of copy, thereby forming a signature, and (b) arranging said sheet indexing means to place side edges of said pairs in a predetermined relation to fold lines of said signature.

9. The method of preparing a copy layout assembly as set forth in claim 8 wherein said adhering said film to the copy sheets includes:

(a) providing a pressure sensitive adhesive on one surface of said film, (b) providing a peel-away protective sheet attached to said adhesive, (c) peeling away a portion of the protective sheet, thereby exposing a portion of the pressure sensitive adhesive with a remaining portion of the adhesive protected by a remaining portion of the protective sheet, (d) said placing said transparent film with index holes in registry with the register pins on the master page layout, (e) pressing the exposed portion of the adhesive into contact with a portion of said signature, into contact with said gripper edge, and into contact with a portion of said masking frame, (f) peeling away the remaining portion of the protective sheet, (g) pressing the remaining portion of the adhesive into contact with the remaining portion of the signature and into contact with the remaining portion of the masking frame whereby the arranged sheets are maintained in precise registry during handling of each copy layout assembly.

10. A method of preparing a copy layout assembly in the making of printing plates including:

(a) providing image bearing sheets, (b) punching aligned index holes in said sheets, said index holes having a predetermined relation with said image, (c) trimming the edges of the image bearing sheets in a predetermined relation to said punched index holes, (d) providing a master copy layout corresponding to the printing plate size, (e) providing index means associated with said master copy layout, said indexing means corresponding to said index holes, (f) providing a gripper edge masking sheet, (g) providing a gripper edge indexing means, (h) placing said gripper edge masking sheet on said gripper edge indexing means, (i) providing a plurality of exterior edge masking sheets, (j) placing said exterior edge masking sheets in a predetermined relation with said gripper edge masking sheet, thereby forming a masking frame including said gripper edge masking sheet, (k) providing an image bearing sheet indexing means, (l) arranging the trimmed sheets on the master copy layout, (m) arranging said image bearing sheets on the sheet indexing means, said image bearing sheets being within said masking frame with the exterior edges of said arranged image bearing sheets adjacent the masking frame, (n) providing a copy layout carrier in the form of a transparent film, (o) punching index holes in said copy layout carrier, said index holes corresponding to the gripper edge indexing means, (p) engaging said index holes of the copy layout carrier with the gripper edge indexing means, (q) securing said copy layout carrier to the arranged image bearing sheets and to the masking frame thereby forming a copy layout flat assembly.

11. The method of preparing a copy layout flat assembly as set forth in claim 10 wherein said securing the copy layout carrier to the arranged image bearing sheets includes:

(a) providing a pressure sensitive adhesive on one face of the copy layout carrier, (b) providing a protective sheet, said protective sheet being attached to said pressure sensitive adhesive, (c) peeling away a portion of the protective sheet, thereby exposing a portion of the pressure sensitive adhesive with a remaining portion of the adhesive protected by the remaining portion of the protective sheet, (d) said engaging the index holes in the copy layout carrier with said gripper edge indexing means, (e) pressing the exposed portion of the pressure sensitive adhesive into contact with a portion of said arranged image bearing sheets and into contact with a portion of said masking frame including said gripper edge masking sheet, (f) peeling away the remaining portion of the protective sheet, and (g) pressing the remaining portion of the pressure sensitive adhesive into contact with the remaining portion of the arranged image bearing sheets and into contact with the remaining portion of the masking frame, whereby the arranged image bearing sheets are maintained in precise registry during handling of the copy layout flat assembly.

12. The method of preparing a copy layout assembly as set forth in claim 11 wherein said trimming the edges of said image bearing sheets includes:

(a) holding each of said image bearing sheets in a first predetermined position, (b) trimming a first margin of each of said image bearing sheets adjacent to and having a predetermined relation to said index holes, (c) providing trimming indexing means with spaced pins of equal size, said pins corresponding in size to said punched index holes, (d) placing each of said image bearing sheets with the index holes engaging the pins of the trimming indexing means, (e) holding each of said image bearing sheets in a second predetermined position, (f) trimming a second margin of each of said image bearing sheets at a predetermined spacing and relation to the index holes, said second trimmed margin being opposed to the first trimmed margin, and (g) trimming side margins of each of said image bearing sheets, whereby the trimmed sheet is a predetermined width forming side edges that are fixed in spacing and relation to said index holes.

13. The method of preparing a copy layout assembly as set forth in claim 12 wherein said trimming side margins of each of said image bearing sheets includes:

(a) holding each image bearing sheet in a predetermined position, said sheets each having two pages of copy thereon, (b) providing an adjustable cutting device adjacent each of the side margins of the imgae bearing sheets, (c) providing a stationary cutting device intermediate the adjustable cutting devices, (d) adjusting said adjustable cutting devices to a predetermined position relative to said index holes in each of said image bearing sheets, and (e) operating the cutting devices thereby cutting each of the image bearing sheet into two separate pages of copy with the trimmed side edges having a predetermined position relative to the index holes in said pages, whereby the trimmed pages of copy are the precise size and shape to be placed on and arranged on said master page layout.

14. The method of preparing a copy layout assembly as set forth in claim 13 wherein making a printing plate includes:

(a) punching index holes adjacent one edge of said plate, said index holes corresponding to said index holes in said copy layout assembly, (b) providing index pins of equal size, said pins corresponding to said index holes in the plate and to said index holes in the copy layout assembly, and (c) inserting said index pins in the plate and in the copy layout assembly thereby aligning and registering the copy layout assembly with the plate.

References Cited

UNITED STATES PATENTS

| | | | |
|---|---|---|---|
| 1,333,544 | 3/1920 | Grass | 95—85 |
| 1,975,439 | 10/1934 | Uher | 95—85 X |
| 2,537,732 | 1/1951 | Angus | 95—85 |
| 2,609,613 | 9/1952 | Capers | 95—85 X |
| 2,659,282 | 11/1953 | Freund | 95—85 X |
| 2,964,042 | 12/1960 | Hawley | 95—85 X |
| 3,256,797 | 6/1966 | Horne | 95—85 |

NORTON ANSHER, Primary Examiner

ROBERT W. ADAMS, Assistant Examiner